Sept. 15, 1970
L. G. POPINSKI
3,528,587
AUTOMATIC LIQUID FEED DEVICE
Filed June 25, 1968
2 Sheets-Sheet 1
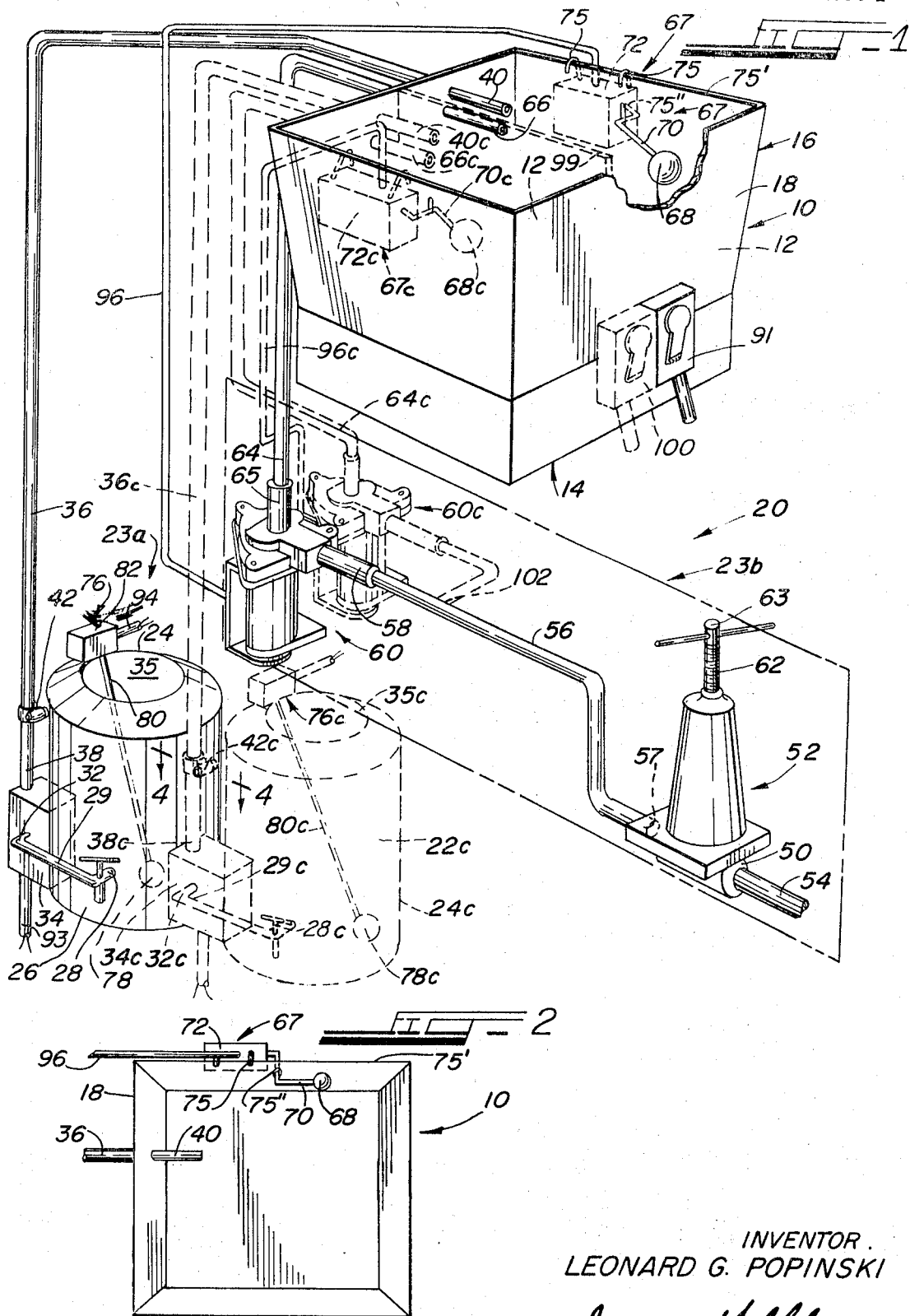
INVENTOR.
LEONARD G. POPINSKI
BY Jerome Goldberg

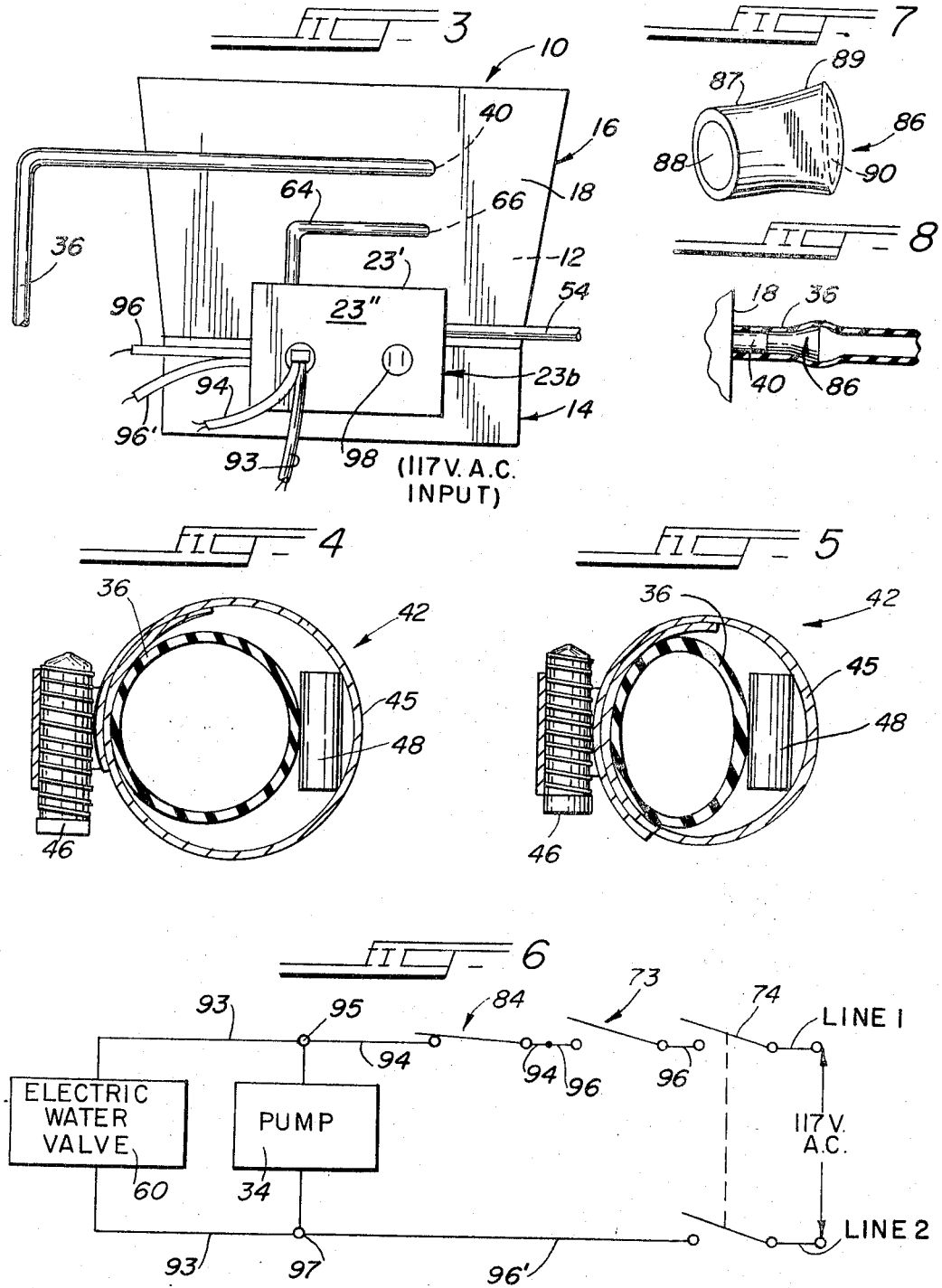

United States Patent Office 3,528,587
Patented Sept. 15, 1970

3,528,587
AUTOMATIC LIQUID FEED DEVICE
Leonard G. Popinski, Chicago, Ill., assignor to The Nedlog Company, Chicago, Ill., a corporation of Illinois
Filed June 25, 1968, Ser. No. 739,806
Int. Cl. B67d 5/56
U.S. Cl. 222—56                                    8 Claims

ABSTRACT OF THE DISCLOSURE

An automatic device for simultaneously feeding a predetermined amount of one liquid and a predetermined amount of another liquid into a beverage dispenser machine to provide a beverage comprising a mixture of said liquids.

BACKGROUND OF THE INVENTION

This invention relates generally to a device for feeding a liquid into a container, and more particularly relates to an automatic device for simultaneously feeding predetermined quantities of at least two liquids into a container to provide a beverage comprising said liquids.

The subject invention is particularly suitable for use with non-carbonated beverage dispenser machines of the kind that continually circulate the beverage contained therein around a cooling surface. These dispensers are extensively used in soda fountains, lunchrooms, snackshops, and refreshment stands.

In the past, the beverages contained in these dispensers were prepared by manually pouring a predetermined quantity of a base or concentrate of a sweet flavored liquid and a predetermined quantity of water, into the receptacle section of the dispenser. Although this was not a complicated task, substantial time and effort were nevertheless required. Quite often, the manual pouring of the liquids resulted in mixtures that were either too sweet or not sweet enough. Also, frequently in the summer months, the beverage dispensers would be empty for long periods until someone was available to fill the machine. Even after the dispenser was filled, it could not be used until the beverage had sufficient time to properly cool. Thus, the inefficiencies in the manual preparation of the beverage, resulted in substantial losses in revenue.

Recently, automatic devices were used to feed water and syrup or base liquid into beverage dispenser machines. A typical prior automatic liquid feed device comprises a chamber having a water compartment and a syrup or liquid base compartment. A pumping means pumped both the water and base from the chamber into the dispenser. A timer mechanism triggered "on" when the water level in the chamber was low, permitted water flow into the chamber for a preset interval of time. A red light indicated when the base liquid supply was empty. The liquid drive systems of these prior automatic devices were extremely complicated and susceptible to malfunction. Moreover, these devices required a substantial water pressure to operate. Consequently, they were generally not usable at high levels with respect to ground, where the water pressure would vary or was normally low. The subject invention overcomes these problems by providing a more simplified and reliable liquid drive system which requires substantially less water pressure to operate properly than was heretofore necessary.

SUMMARY OF THE INVENTION

The automatic liquid feed device of this invention is adaptable for use with beverage dispenser machines. The device automatically feeds a predetermined amount of water simultaneous with a predetermined amount of a concentrate or base of a sweet flavored liquid to provide a liquid mixture comprising the water and base. Switch means are provided to automatically cause the water and base liquid to flow when the liquid in the bowl of the beverage dispenser falls below a predetermined level and to stop the flow of water and base liquid when the liquid level in the bowl reaches a predetermined level.

Switch means are also provided to turn off the flow of base liquid and water when the tank of base liquid is substantially empty.

It is therefore a primary object of this invention to provide a dependable device for automatically and simultaneously feeding the proper amount of water and a liquid concentrate or base into the bowl of a beverage dispenser device when the beverage in the bowl falls below a predetermined level.

Another object is to provide a reliable and simplified device for feeding liquid, which is easily adaptable for use with conventional beverage dispensers.

Another object is to provide an automatic device for simultaneously feeding a predetermined amount of water and a predetermined amount of a liquid concentrate into a beverage dispenser.

Another object is to provide an automatic feed device which feeds liquid only after the liquid in a beverage dispenser falls below a predeterminel level, and stops feeding liquid when the liquid in the beverage dispenser reaches a predetermined level.

Still another object is to provide an automatic feed device which feeds water and a concentrate of a sweet flavored liquid to provide a refreshing beverage comprising a mixture of the water and concentrate.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

BRIEF DESCRIPTION OF THE DRAWINGS

Referring to the drawings in which the same characters of reference are employed to indicate corresponding or similar parts throughout the several figures of the drawings:

FIG. 1 is a perspective enlarged view of a liquid feed device embodying the principles of the invention, for feeding liquids into a beverage dispenser machine to provide a beverage and showing a second liquid feed device in phantom for feeding liquids into the dispenser to provide a second beverage;

FIG. 2 is a top view of the beverage dispenser with the cover removed;

FIG. 3 is a rear view of a beverage dispenser machine showing the water feed section of the liquid feed device mounted on the dispenser;

FIG. 4 is a sectional view of a liquid flow control means for controlling the flow of the base liquid;

FIG. 5 is a view similar to FIG. 4 and showing the control means restricting the flexible pipe;

FIG. 6 illustrates the electrical schematic for the liquid feed device;

FIG. 7 shows a perspective view of another liquid flow control means; and

FIG. 8 shows the control means of FIG. 7 inside a liquid conducting pipe.

DESCRIPTION OF THE PREFERRED EMBODIMENT

Referring now to FIGS. 1 and 3 of the drawings, the reference numeral 10 indicates generally a machine for dispensing beverages 12, particularly cold non-carbonated soft drinks. The machine 10 includes a lower section 14 containing a cooling mechanism and an upper bowl section 16 comprising a transparent outer wall 18. The bowl section 16 functions as a receptacle for containing the beverage 12. A liquid feed device indicated generally by the reference numeral 20 (FIG. 1) feeds the liquids comprising the beverage 12 into the device 10.

The beverage 12 is a mixture of a predetermined amount of water mixed with a predetermined amount of concentrate or base liquid 22 to provide an enjoyable and refreshing flavored drink. Generally, for each unit volume of base liquid 22, a substantially greater volume of water is required to be added to provide the proper mixture of beverage 12. An agitator may circulate the beverage around a cooling surface, generally a coiled body or plate, thereby continually cooling and mixing the beverage 12. A sprayer means driven by a pump (not shown) may also be used, whereby beverage is taken from the bottom of the bowl section, cooled and then sprayed upwardly against the bowl top cover.

The liquid feed device 20 comprises a base feed section 23a and a water feed section 23b. The main component parts of the water feed section 23b (FIG. 1) are housed in a metal box 23' with a removable back 23" and mounted on the rear of the dispenser machine 10 as shown in FIG. 3.

The base liquid 22 is stored in a tank 24 (FIG. 1). The lower end 26 of the tank includes an outlet spigot 28. One end of a conduit 29 is connected to the spigot 28. The opposite end of conduit 29 is attached to an input 32 to a pump 34. When the tank 24 is empty, additional base liquid 22 is poured into the tank from the top end 35.

A flexible pipe 36 is connected to the output end 38 of the pump 34 and is press fitted on a base input terminal 40 which extends outward, and inward (FIG. 2) from the outer wall 18 of the upper section 16 of the dispenser machine 10.

A base flow control means indicated generally by the reference numeral 42 (see FIGS. 1, 4 and 5) controls the quantity of base liquid 22 flowing per unit time through the flexible pipe 36. The base flow control 42 means comprises a clamp ring 45 and screw adjuster 46. A cylindrical pressure member 48 is positioned between the ring 45 and the flexible pipe 36. The inward or outward movement of the screw adjuster 46 precisely and positively controls the pressure applied by the pressure member 48 and ring 45 against flexible pipe 36. In this manner, incremental variation in the base liquid flow are conveniently and precisely made. FIG. 5 illustrates the pipe 36 in a restricted condition.

An input port 50 of a water regulator 52 (FIG. 1) is connected to an outlet conduit 54 from a water source (not shown). A pipe line 56 connects an output port 57 of the water regulator 52 to an input 58 to an electric water valve indicated generally by the reference numeral 60. The valve 60 has an open and closed position which controls the flow or non-flow of water into machine 10. The opening and closing of the valve is electrically controlled.

The water regulator 52 includes a water pressure adjustment means 62. The inward or outward movement of the adjustment means 62 caused by a rotational force manually applied at the outer end 63 of the adjustment means 62, varies the water pressure appearing at the output port 57. Normally, adjustment means 62 is set only when the water regulator 52 is initially installed. For proper mixing of the water and base liquid 22, approximately twenty pounds water pressure is generally required at the output port 57 of the regulator 52 for optimum operation of the system.

A pipe section 64 (FIGS. 1 and 3) is connected from the output 65 of the valve 60 to a water input terminal 66 extending outward and inward from the bowl 16 of the dispenser 10 (FIG. 1).

A main float control switch means indicated generally by the reference numeral 67 (FIG. 1) controls the flow of water and base liquid 22 into the beverage dispenser machine 10. The float control switch means 67 comprises a float ball 68 attached to the outer end of a stem 70. The opposite or inner end of the stem 70 is connected to a housing 72. Control switch 73 is contained within housing 72 and is shown in an "off" or open position in FIG. 6. Switch 73 may be a mercury switch.

When switch 73 is in an "on" or closed position and the the main power switch 74 is closed, line 1 of the 117 v. AC input power is connected to the pump 34 and to the electric water valve 60 causing the pump to operate and the water valve to remain open. When switch 73 moves from the "on" to the open or "off" position (FIG. 6), line 1 voltage is removed and the pump 34 stops operating and the valve 60 closes.

As may be seen in FIG. 1, the housing 72 of the control switch means 67 is supported on the outside of the bowl section 16 by arcuate hanger wires 75 which hang over the outer edge 75' of bowl section 16. The stem 70 extends through an aperture 75" to the inside of bowl 16.

If the beverage in the dispenser machine 10 drops below a predetermined level, the downward movement of the ball 68 and the stem 70 cause the switch 73 (FIG. 6) to move from the "off" position to the "on" position, whereby the pump 34 is turned "on" and the water valve 60 is opened. The water and base liquid flow simultaneously into the dispenser machine 10. When the beverage content is replenished and the ball 68 and stem 70 are raised upwardly past said predetermined level, switch 73 is switched from the "on" position back to the "off" position, thereby stopping the flow of water and base into the device by turning "off" the pump 34 and closing the water valve 60.

Arcuate hanger wires 75 extend out from housing 72 of the control switch means 67. Housing 72 is positioned on the outside of the outer wall 18 and supported by the wires 75 hanging over the upper edge 75' of the outer wall. The stem 70 extends through an opening 75" to the inside of the receptacle 18.

A secondary float control switch means indicated generally by the reference numeral 76 (FIG. 1) turns pump 34 "off" and closes water valve 60 when the base liquid in the tank 24 is essentially empty. A float ball 78 is attached to the outer end of an elongated rod 80 which extends inside the tank 24. The inner end of the rod 80 is connected to a housing 82 which may be fastened to the outside of the tank 24. Housing 82 contains a switch 84 (FIG. 6) which also may be a mercury switch.

The switch 84 is normally closed as shown in FIG. 6. When tank 24 is empty of base liquid, rod 80 moves to a substantially perpendicular position with respect to the bottom of the tank 24 to cause switch 84 to open. Line 1 voltage is thereby disconnected from the base pump 34 and water valve 60 and the pump is turned off and the water valve is closed even when the main control switch 73 of the main float switch means 67 is in its closed position. Thus, the flow of liquid is shut off until the base liquid 22 is replenished.

Referring now particularly to FIGS. 7 and 8, a hollow nozzle 86 may be used instead of the base flow control means 42 shown in FIGS. 4 and 5. The nozzle 86 is positioned inside the flexible pipe 36 adjacent the end thereof which attaches to the base input terminals 40 (FIG. 8). The nozzle 86 is dimensioned to press-fit in a secure position inside the tube 36.

Nozzle 86 comprises a front portion 87 having a substantially circular orifice 88. The rear portion 89 has a substantially narrower orifice 90. The nozzle 86 is formed of a bendable metal material which enables the size of orifice 90 to be increased or decreased, and thereby control the flow of base liquid. It has been found that with the use of nozzle 86 as a liquid flow control, fruit stock does not accumulate at the nozzle 86.

To precisely and accurately control the proportional flow of base liquid with respect to waterflow, the size of orifice 90 of nozzle 86 is set. Then the water pressure adjustment means 62, which is a fine adjustment, is set to the desired proportional flow rate of base liquid with respect to water flow, and thereby providing the desired consistency for the beverage 12.

The water and base liquid flowing into the bowl section 16 are mixed together to form the mixture comprising the beverage 12. The beverage is dispensed from the machine at an outlet 91 (FIG. 1).

Electrical connector means 93 connects pump 34 in parallel with water valve 60 (FIGS. 1, 3 and 6). Switch 84 of the secondary control switch means 76 is connected by the electrical connector means 94 to terminal 95 (FIG. 6) and to the main control switch 73. Electrical connector leads 96, 96′ connect respectively the switch 73 and terminal 97 with the main power switch 74 (FIG. 6). The input electrical power is connected into the system at input 98 (FIG. 3).

Another liquid feed device 20 may be attached to the machine 10 as shown in phantom in FIG. 1, to provide two different beverages for dispensing. Similar parts of the second liquid feed device are identified by the same numeral with a suffix "c." In such an arrangement, a partition wall 99 divides the bowl section 16 into separate beverage compartments, each containing a different beverage. The outlet 91 dispenses one beverage and a second outlet 100 dispenses the other.

As shown, a second electric valve 60c may be connected at point 102 to the same pipe line 56 (FIG. 1), as the electric valve 60. Water from valve 60c flows through pipe 64c into the bowl 16 at inlet 66c. In the illustrated configuration, the same water regulator 52 controls the pressure of the water flowing through both valves 60 and 60c. However, if the single regulator 52 does not adequately maintain the proper proportion of water and base flowing into each beverage compartment, two separate water regulators may be used.

The pump 34c pumps the base liquid from tank 24c through pipe 36c and into the bowl 16 at inlet 66c. If tank 24 or tank 24c containing the base liquid 22 is empty, the corresponding water valve 60 or 60c shuts off by the action of the secondary float control valve 76 or 76c until the empty tank is replenished.

It is believed that my invention, its mode of construction and assembly, and many of its advantages should be readily understood from the foregoing without further description, and it should also be manifest that while a preferred embodiment of this invention has been shown and described for illustrative purposes, the structural details are nevertheless capable of wide variation within the purview of my invention as defined in the appended claims.

What I claim and desire to secure by Letters Patent of the United States is:

1. In a beverage dispenser machine having a bowl to contain a beverage for dispensing, a feed means for feeding at least one liquid into the bowl, said feed means comprising:

a container for said one liquid;

a pump means associated with the container and said bowl for pumping said one liquid from the container into said bowl;

an electrical power means;

a first level responsive switch means interposed between the power means and said pump means and having an on-position and an off-position, said first switch means being in the on-position when the beverage in the bowl falls below a predetermined high level for causing said electrical power means to be connected to said pump means, and thereby enabling said pump to pump said liquid into the bowl, said first switch means being in the off-position when the beverage in said bowl reaches said predetermined level for causing disconnection of the electrical power means from the pump means, thereby preventing said pump from pumping said liquid into the bowl; and a second level responsive switch means interposed between the power means and said pump means to disconnect said pump means from said power means to prevent the operation of said pump means when said one liquid falls below a predetermined low level in said container even when the beverage in the bowl falls below said high level.

2. The beverage dispenser of claim 1 wherein said feed means comprises:

a flexible pipe connecting said pump with the bowl; and a hollow nozzle member having an inlet orifice and an outlet orifice, said nozzle being press-fitted in said pipe, variation of the size of at least one of said orifices varying the flow of said one liquid through said pipe per unit time.

3. In a beverage dispenser machine having a bowl to contain a beverage for dispensing, a feed means for feeding at least one liquid into the machine, said beverage comprising at least said one liquid, said feed means comprising:

a container for said one liquid;

a pump means associated with the container and said bowl for pumping said one liquid from the container into said bowl;

a level responsive switch means having a non-position and an off-position, said switch means being in the off-position when the beverage in said bowl exceeds a predetermined level and in the on-position when the beverage in said bowl falls below said predetermined level to permit said one liquid to be pumped into the bowl;

a pipe connecting the pump with the bowl;

a clamp member comprising a ring encircling the outside of the pipe; and a screw adjuster associated with the ring member, said ring being tightened around said pipe when the screw adjuster is turned in one direction to decrease the flow of said one liquid per uint time and being loosened when turned in the opposite direction to increase the flow of said one liquid.

4. The beverage dispenser of claim 3 wherein:

a cylindrical pressure member is positioned between one side of the pipe and said ring, said ring bearing against the opposite side of the pipe, said pressure member and ring restricting said pipe when tightened.

5. In a beverage dispenser machine having a bowl section to contain a beverage for dispensing, a feed means for feeding at least one liquid into the machine, said beverage comprising at least said one liquid, said feed means comprising:

a container for said one liquid;

a pump means associated with the container and said bowl for pumping said one liquid from the container into said bowl;

an electrical power means;

a level responsive switch means having an on-position and an off-position, said switch means being in the off-position when the beverage in said bowl exceeds a predetermined level to disconnect said electrical power means from said pump and thereby prevent said pump from pumping said one liquid into the container, said first switch means being in the on-position when the beverage falls below said predetermined level to connect said electrical power means to the pump and thereby enable said pump to pump said one liquid into the bowl;
a second liquid source;
regulator means associated with the source to control the flow of said second liquid;
a valve means having an on-condition and an off-condition;
a conduit means for conducting the second liquid from the regulator to the valve means;
a connecting means connecting the bowl with the valve means, said valve means permitting the flow of the second liquid into the bowl when in the on-condition and presenting the flow of the second liquid when in the off-condition, said valve means being in the on-condition when the first switch means is in its on-position, said valve means being in the off-position when said first switch means is in its off-position; and
a second level responsive switch associated with said valve and said pump means, said second switch turning off said pump and closing said valve when said one liquid is substantially empty in said container;
a clamp member comprising a ring which encircles the outside of the pipe; and
a screw adjuster associated with the ring member, said ring being tightened around said pipe when the screw adjuster is turned in one direction to decrease the flow of said one liquid per unit time and being loosened when turned in the opposite direction to increase the flow of said one liquid.

6. Apparatus for filling a dispenser comprising a bowl containing a beverage, said beverage including a first liquid and a second liquid, said apparatus comprising:
first power means for flowing said first liquid into said bowl from a container of said first liquid being responsive to the beverage in the bowl falling below a predetermined high level;
second power means for simultaneously flowing said second liquid into the bowl responsive to said beverage level falling below said high level;
means for stopping the simultaneous flow of said first and second liquids responsive to the beverage in the bowl reaching said predetermined high level; and
means for preventing further flow of said first and second liquids responsive to the quantity of said first liquid contained in said container falling below a predetermined low level even when the beverage in the bowl falls below said high level.

7. The apparatus of claim 6 including means for:
mixing said first liquid and said second liquid in said bowl.

8. In a beverage dispenser, machine having a bowl to contain a beverage for dispensing, a feed means for feeding a first liquid and a second liquid into the bowl, said feed means comprising:
a container for said first liquid;
a pump means associated with the container and said bowl for pumping said first liquid from the container into said bowl;
a source for said second liquid;
a valve means having an on-condition and an off-condition;
a regulator means interposed between the source and the valve means to control the flow of said second liquid;
a connecting means connecting the bowl with the valve means, said valve permitting flow of said second liquid into the bowl when in the on-condition and preventing the flow of the second liquid when in the off-condition;
an electrical power means;
a first level responsive switch means having an on-position and an off-position, said first switch means being in the on-position when the beverage in the bowl falls below a predetermined high level for causing said electrical power means to be connected to said pump means and said valve means whereby said pump means pumps said first liquid into the bowl and said valve means moves to its on-condition so that said second liquid simultaneously flows into the bowl, said first switch being in the off-position when the beverage in said bowl reaches said predetermined level for causing disconnection of the electrical power means from the pump and said valve means, thereby turning off said pump and causing said valve means to move to its off-condition, to prevent flow of said first and second liquids into the bowl; and
a second level responsive switch means having an off-position and an on-position, said second switch means switching from the on-position to the off-position when said liquid in said container falls below a predetermined low level for preventing connection of the power means to said pump means and said valve means, thereby preventing flow of said first and second liquids even when the beverage in the bowl falls below said high level.

References Cited
UNITED STATES PATENTS

| | | | |
|---|---|---|---|
| 1,586,745 | 6/1926 | Hules | 222—333 X |
| 1,610,889 | 12/1926 | Schmidt | 138—45 |
| 1,874,025 | 8/1932 | Clapp | 222—66 X |
| 2,692,923 | 10/1954 | Ash | 222—67 X |
| 2,791,239 | 5/1957 | Mason | 138—45 |
| 2,972,434 | 2/1961 | James | 222—67 X |
| 3,149,753 | 9/1964 | Forsyth | 222—66 X |
| 3,084,047 | 4/1963 | Holstein et al. | 222—67 X |
| 3,323,681 | 6/1967 | DiVette et al. | 222—129.1 X |
| 3,341,077 | 9/1967 | Gordon | 222—129.1 |

ROBERT B. REEVES, Primary Examiner

H. S. LANE, Assistant Examiner

U.S. Cl. X.R.

222—63, 68, 76, 129.1